May 10, 1927.
J. O. BOVING
1,628,026
HYDRAULIC AIR INSPIRING PLANT
Filed May 4, 1926
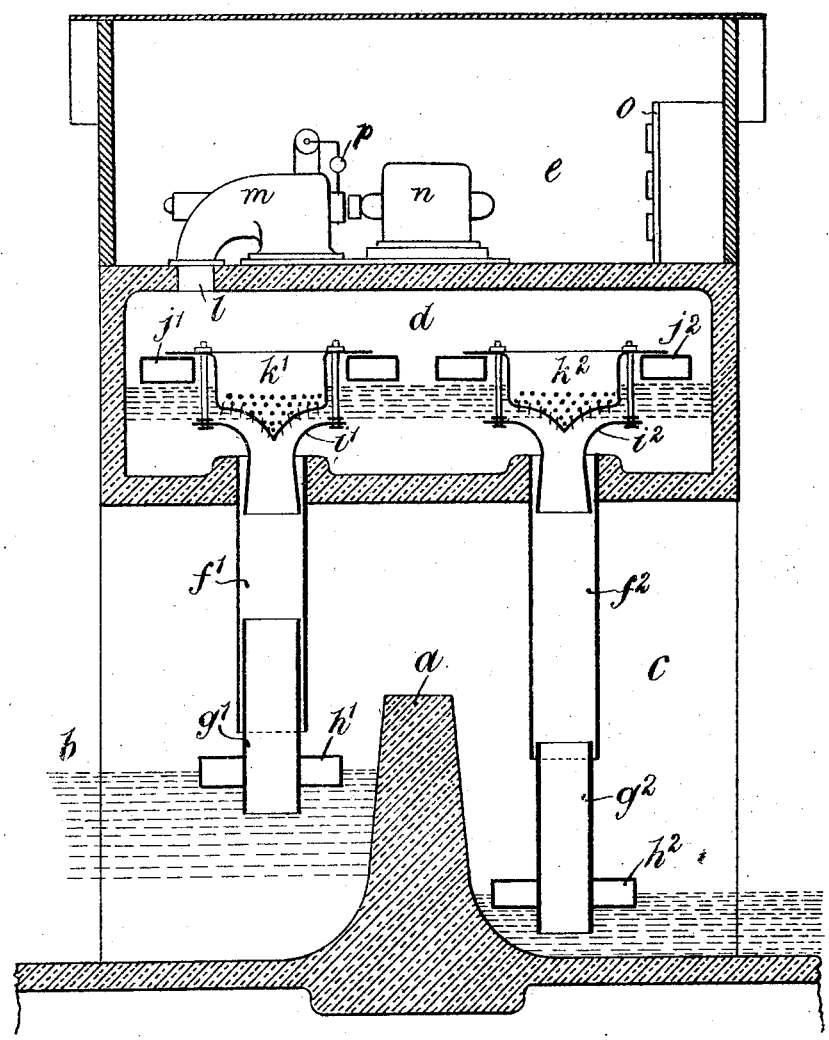
INVENTOR.
Jens Orten Boving
BY: Ruep, Boyer & Bakelar
ATTORNEYS.

Patented May 10, 1927.

1,628,026

UNITED STATES PATENT OFFICE.

JENS ORTEN BOVING, OF WESTMINSTER, LONDON, ENGLAND.

HYDRAULIC AIR-INSPIRING PLANT.

Application filed May 4, 1926, Serial No. 106,603, and in Great Britain June 2, 1925.

This invention relates to hydraulic plants for the utilization of tidal energy of the type in which water, under the head due to difference of levels, inspires air in flowing down a shaft and the object of the invention is to enable plants of this character to maintain a large flow of air at a pressure below atmospheric, whereby, for instance, air can be exhausted from an air turbine and power thus generated.

In hydraulic plants of this type hitherto the water flows down a shaft and ascends another shaft to escape at a lower level than the level at the intake, and air inspired by the descending column of water separates from such water and is trapped in a chamber at the bottom of the shafts and is thus compressed by being subjected to the pressure head of the column of water in the upcast shaft. The two shafts alternately become downcast and upcast shafts according to the state of the tide and each has an alternately operative inlet rising and falling with the respective water level. Power is generated by the compression of the entrained air trapped at the bottom of the shafts.

Now the tidal energy utilization plant of the present invention operates on what may be regarded as the inversion of the above described arrangement, for therein the water in flowing from a higher to a lower level first ascends one shaft and then descends the other shaft and in descending inspires air from above and in direct contact with the water in a chamber above and interconnecting the two shafts.

The tidal energy utilization plant according to the invention therefore consists of a shaft leading from water in a dammed-in basin, a shaft leading from water in a tidal region, a closed chamber to which air is admitted under control interconnecting the upper ends of the two shafts, means for inspiring air from above and in contact with the water in the chamber by water descending either shaft, and means for maintaining the lower ends of both shafts close beneath the respective water levels.

To preserve the optimum conditions of air-inspiry, preferably the air inspiring means rises and falls with the level of the water in the chamber as it fluctuates under changing conditions of load or working head. For example, as in the case of hydraulic air compression plants as described above, the water inlet with air-inspiring passages above the downcast shaft may be float-supported with a telescopic pipe in continuation of the head of the downcast shaft.

The entrainment of air by the water flowing down the downcast shaft rarefies the air above the water in the chamber, and by placing such air space in communication with the exhaust or suction end of an air turbine, power can be developed.

The rarefied entrained air is in its descent with the water in the downcast shaft progressively compressed to atmospheric pressure. The lower end of the shaft acting as downcast shaft is maintained close beneath the water level in the basin or tidal region, as the case may be, in order to avoid counterbalancing a portion of the column of air and water in the downcast shaft by an equivalent but shorter head of water in the basin or tidal region. For this purpose it may be arranged that the lower end of each shaft is telescopic and float-supported so as to be always only just below the level of the water at the lower end.

The chamber at the head of the shafts conveniently straddles the dam which encloses the tidal basin.

A tidal energy utilization plant according to the invention is diagrammatically illustrated by way of example on the accompanying drawing, which shows a transverse section through a dam separating a basin from a tidal region and a chamber and power house surmounting the dam. In this drawing:—

$a$ is a dam separating a basin $b$ from a tidal region $c$.

Straddling the dam $a$ is a closed chamber $d$, above which is a power house $e$.

Depending from and communicating with the interior of the chamber $d$ and extending towards the water in the basin $b$, is a shaft $f^1$. The lower end of this shaft $f^1$ is extended by a pipe $g^1$ telescoping therein and supported by an annular float $h^1$ so that its lower end is close beneath the level of the water in the basin $b$.

Similarly a shaft $f^2$ depends from the chamber $d$ on the tidal region $c$ side of the dam $a$ and is extended by a telescoping pipe $g^2$ supported by an annular float $h^2$, so that its end is likewise close beneath the level of the water in the tidal region $c$.

The upper end of each shaft $f^1$, $f^2$ is fitted with a telescoping annular inlet head $i^1$, $i^2$ respectively, supported by an annular float $f^1$, $f^2$ respectively. Each inlet head $i^1$, $i^2$ is provided with a perforated cover plate $k^1$, $k^2$ respectively, with upstanding borders whereby air from the chamber $b$ is inspired by water descending either shaft $f^1$ or $f^2$.

The chamber $d$ communicates by an opening $l$ with the suction end of an air turbine $m$ located in the power house $e$ and coupled to and driving an electric generator $n$. $o$ represents the switch and distribution board for the electric energy generated by the generator $n$. $p$ represents a governor controlling the admission of air from the atmosphere to the turbine $m$.

The plant operates as follows:—

Assuming as shown that the state of tide is such that the water level in the basin $b$ is higher than the water level in the tidal region $c$, water ascends the shaft $f^1$ and descends the shaft $f^2$, under the head due to the difference in such water levels.

The water descending the shaft $f^2$ inspires air through the perforated cover plate $k^2$ and maintains the air in the chamber $d$ at a pressure below atmospheric. The reduced air pressure in the chamber $d$ exerts a suction on the turbine $m$ and drives same by air admitted, under control of the governor $p$, to the admission end thereof.

The water descending the shaft $f^2$ is replaced by water which ascends the shaft $f^1$.

On the state of the tide changing so that the level in the tidal region $c$ is higher than that in the basin $b$, the flow of water reverses, the shaft $f^2$ becoming the upcast shaft and the shaft $f^1$ the downcast shaft. The inlet head $i^1$ then inspires air from the chamber $d$.

Obviously at certain phases of the tide the levels in the basin $b$ and tidal region $c$ will be approximately equal or their difference will be insufficient efficiently to operate the plant, when, as is usual with tidal energy utilization systems, the plant will be out of operation.

The purposes of the heads $i^1$, $i^2$ and the extension pipes $g^1$, $g^2$ being float-supported are, as has been explained above, to maintain the air-entraining perforations at the most efficient level relatively to the water level in the chamber $d$, which will fluctuate under a varying load on the turbine $m$ and under variation in the difference in the levels in the basin $b$ and tidal region $c$, and to avoid a counter-head of water acting against the descending column of air and water in the shaft $f^1$ or $f^2$ which is acting as the downcast shaft.

The communication between the atmosphere and the chamber $d$ is interrupted by the attendants closing the turbine valves or automatically at such stages of the tide at which the water levels in the basin $b$ and tidal region $c$ are approximately equal, so as to avoid the vacuum in the chamber $d$ breaking, and recourse being had to a priming pump for restarting the apparatus.

To prevent freezing in the chamber $d$ under the diminution of temperature which accompanies the rarefaction of the air, the air may be preheated before passing through the turbine $m$.

It will be appreciated that the above described system obviates the necessity of an air separator which is always a cumbersome and expensive feature in a hydraulic air compressor plant of the type described.

I claim:

1. A tidal energy utilization plant consisting of a shaft leading from water in a dammed-in basin, a shaft leading from water in a tidal region, a closed chamber to which air is admitted under control interconnecting the upper ends of said two shafts, means above each of said shafts for inspiring air from above and in contact with the water in said chamber by water descending said shafts, and means for maintaining the lower ends of both of said shafts close beneath the respective water level in said dammed-in basin and in said tidal region.

2. A tidal energy utilization plant consisting of a telescopic shaft leading from water in a dammed-in basin, a float supporting the lower end of said shaft close beneath the water level in said dammed-in basin, a telescopic shaft leading from water in a tidal region, a float supporting the lower end of said second shaft close beneath the water level in said tidal region, a closed chamber to which air is admitted under control interconnecting the upper ends of said two shafts, and means above each of said shafts for inspiring air from above and in contact with the water in said chamber by water descending said shafts.

3. A tidal energy utilization plant consisting of a shaft leading from water in a dammed-in basin, a shaft leading from water in a tidal region, a closed chamber to which air is admitted under control interconnecting the upper ends of said two shafts, means above each of said shafts for inspiring air from above and in contact with the water in said chamber by water descending said shafts and rising and falling with the level of the water in said chamber, and means for maintaining the lower ends of both of said shafts close beneath the respective water level in said dammed-in basin and in said tidal region.

4. A tidal energy utilization plant consisting of a shaft leading from water in a dammed-in basin, a shaft leading from water in a tidal region, a closed chamber to which air is admitted under control interconnecting the upper ends of said two shafts, means above each of said shafts for inspiring air from above and in contact with the water in said chamber by water descending said shafts, a float supporting each of said air-inspiring means, and means for maintaining the lower ends of both of said shafts close beneath the respective water level in said dammed-in basin and in said tidal region.

5. A tidal energy utilization plant consisting of a dam, a shaft leading from water in a basin, dammed-in by said dam, a shaft leading from water in a tidal region, a closed chamber straddling said dam to which air is admitted under control interconnecting the upper ends of said two shafts, means above each of said shafts for inspiring air from above and in contact with the water in said chamber by water descending said shafts, and means for maintaining the lower ends of both of said shafts close beneath the respective water level in said dammed-in basin and in said tidal region.

6. A tidal energy utilization plant consisting of a telescopic shaft leading from water in a dammed-in basin, a float supporting the lower end of said shaft close beneath the water level in said dammed-in basin, a telescopic shaft leading from water in a tidal region, a float supporting the lower end of said second shaft close beneath the water level in said tidal region, a closed chamber to which air is admitted under control interconnecting the upper ends of said two shafts, and means above each of said shafts for inspiring air from above and in contact with the water in said chamber by water descending said shafts and rising and falling with the level of the water in said chamber.

7. A tidal energy utilization plant consisting of a dam, a telescopic shaft leading from water in a basin dammed-in by said dam, a float supporting the lower end of said shaft close beneath the water level in said dammed-in basin, a telescopic shaft leading from water in a tidal region, a float supporting the lower end of said second shaft close beneath the water level in said tidal region, a closed chamber straddling said dam to which air is admitted under control interconnecting the upper ends of said two shafts, and means above each of said shafts for inspiring air from above and in contact with the water in said chamber by water descending said shafts.

8. A tidal energy utilization plant consisting of a dam, a telescopic shaft leading from water in a basin dammed-in by said dam, a float supporting the lower end of said shaft close beneath the water level in said dammed-in basin, a telescopic shaft leading from water in a tidal region, a float supporting the lower end of said second shaft close beneath the water level in said tidal region, a closed chamber straddling said dam to which air is admitted under control interconnecting the upper ends of said two shafts, and means above each of said shafts for inspiring air from above and in contact with the water in said chamber by water descending said shafts and rising and falling with the level of the water in said chamber.

9. A tidal energy utilization plant consisting of a telescopic shaft leading from water in a dammed-in basin, a float supporting the lower end of said shaft close beneath the water level in said dammed-in basin, a telescopic shaft leading from water in a tidal region, a float supporting the lower end of said second shaft close beneath the water level in said tidal region, a closed chamber to which air is admitted under control interconnecting the upper ends of said two shafts, means above each of said shafts for inspiring air from above and in contact with the water in said chamber by water descending said shafts, and a float supporting each of said air-inspiring means.

10. A tidal energy utilization plant consisting of a dam, a telescopic shaft leading from water in a basin dammed-in by said dam, a float supporting the lower end of said shaft close beneath the water level in said dammed-in basin, a telescopic shaft leading from water in a tidal region, a float supporting the lower end of said second shaft close beneath the water level in said tidal region, a closed chamber straddling said dam to which air is admitted under control interconnecting the upper ends of said two shafts, means above each of said shafts for inspiring air from above and in contact with the water in said chamber by water descending said shafts, and a float supporting each of said air-inspiring means.

In testimony whereof I have signed my name to this specification.

JENS ORTEN BOVING.